United States Patent
Elliott

Patent Number: 5,957,464
Date of Patent: Sep. 28, 1999

[54] SPLIT DOVE-TAIL GASKET CHANNEL FOR ROUND GASKET MATERIAL

[75] Inventor: Michael David Elliott, El Granada, Calif.

[73] Assignee: interWAVE Communications, Hamilton, Bermuda

[21] Appl. No.: 08/893,415

[22] Filed: Jul. 11, 1997

[51] Int. Cl.⁶ .................................................. F16J 15/08
[52] U.S. Cl. ...................... 277/608; 277/616; 277/637; 277/641
[58] Field of Search ................................ 277/608, 609, 277/614, 616, 637, 643, 641

[56] References Cited

U.S. PATENT DOCUMENTS

| | | | |
|---|---|---|---|
| 4,303,251 | 12/1981 | Harra et al. | 277/236 |
| 4,648,740 | 3/1987 | Carlson | 404/25 |
| 5,799,954 | 1/1997 | Layer | 277/614 |

Primary Examiner—Flemming Saether
Assistant Examiner—John B. Walsh
Attorney, Agent, or Firm—Flehr Hohbach Test Albritton & Herbert LLP

[57] ABSTRACT

A split dove-tail gasket channel structure includes a fir structure having a first external surface and a first edge plane substantially parallel to the first external surface, a first surface substantially perpendicular to the first edge plane, a second surface adjacent to the first surface and at an acute angle to the first edge plane, and a third surface adjacent to the second surface and at an acute angle to the first edge plane. A second structure has a second external surface and a second edge plane substantially parallel to the second external surface, a fourth surface substantially perpendicular to the second edge plane, a fifth surface adjacent to the fourth surface and at an acute angle to the second edge plane, and a sixth surface adjacent to the fifth surface and at an acute angle to the second edge plane. The first surface and the fourth surface are configured to complement one another, the second surface and the fifth surface are configured to complement one another and the third surface and the sixth surface are configured to oppose one another. A gasket is positioned between the third surface and the sixth surface to form the seal. In another embodiment, the sixth surface is positioned at an acute angle with respect to the fifth surface, creating a channel therebetween. Advantages of the invention include an upper structure and a lower structure that provide a good seal but with a smaller size and more consistent thickness than conventional structures.

8 Claims, 4 Drawing Sheets

SPLIT DOVE-TAIL GASKET CHANNEL FOR ROUND GASKET MATERIAL

FIELD

The present invention relates to a split dove-tail gasket channel for round gasket material.

BACKGROUND

FIGS. 1–3 illustrate conventional structures for employing round gasket material in a groove or channel to form a seal between two parts. These gasket materials are typically rubber, silicon or other similarly supple material. The gasket material assists in providing a tight seal to, for example, hold pressure within a chamber, prevent penetration of water or dust, or other similar application.

Conventional structures are described with reference to FIGS. 1–3. In FIG. 1, for example, an upper structure 10 includes a semicircular recess 12 where the gasket 14 is seated. A lower structure 16 has a corresponding semicircular recess 18 where the gasket 14 is seated. When the upper structure and the lower structure are pressed together, the gasket material deforms into gap 20 and provides a tight seal. As shown, the width of the upper structure increases at the location of the recess 12. This enlargement is to provide a large contact surface between the upper structure and lower structure and to provide a wide gap in which the gasket can deform.

In FIG. 2, for example, an upper structure 10 includes a semicircular recess 12 where the gasket 14 is seated. A lower structure 16 does not have a corresponding recess where the gasket 14 is seated. When the upper structure and the lower structure are pressed together, the gasket material deforms into gap 20 and provides a tight seal.

The conventional structures shown in FIGS. 1–3 provide the gap illustrated as 20 between the upper and lower structures to permit the gasket to deform into the gap 20 and provide a good seal. However, some gasket materials deteriorate when exposed to sunlight or destructive contaminates. To reduce exposure to sunlight and contaminants, the structure of FIG. 3 includes a sun block 22. The intent of the sun block is to prevent the sun or contaminates from coming in contact with the gasket material. This structure further enlarges the width of the upper structure and lower structure.

A significant limitation of these conventional gasket channel structures is that they require that the upper structure and lower structure be widened where the gasket is to be installed. This wider construction of the upper structure and lower structure is not desirable because it uses excess material, causes higher cost, increases construction time because the machinists have to specially insure that the structures are properly constructed and free of manufacturing artifacts (e.g. burrs), and can complicate installation because of the increased size around the joining locations.

What is needed is a structure that can provide a good seal with less structural materials, and that when the upper structure and the lower structure are joined has substantially the same thickness of the upper structure and the lower structure.

SUMMARY

The invention overcomes the identified problems by constructing an upper structure and a lower structure that provide a good seal but with a smaller size. An exemplary embodiment of the invention includes a first structure having a first external surface and a first edge plane substantially parallel to the first external surface, a first surface substantially perpendicular to the first edge plane, a second surface adjacent to the first surface and at an acute angle to the first edge plane, and a third surface adjacent to the second surface and at an acute angle to the first edge plane. A second structure has a second external surface and a second edge plane substantially parallel to the second external surface, a fourth surface substantially perpendicular to the second edge plane, a fifth surface adjacent to the fourth surface and at an acute angle to the second edge plane, and a sixth surface adjacent to the fifth surface and at an acute angle to the second edge plane. The first surface and the fourth surface are configured to complement one another, the second surface and the fifth surface are configured to complement one another and the third surface and the sixth surface are configured to oppose one another. A gasket is positioned between the third surface and the sixth surface to form the seal.

In another embodiment, the sixth surface is positioned at an cute angle with respect to the fifth surface, creating a channel therebetween.

Advantages of the invention include an upper structure and a lower structure that provide a good seal but with a smaller size than conventional structures, and that when the upper structure and the lower structure are joined the union has substantially the same thickness of the upper structure and the lower structure.

BRIEF DESCRIPTION OF THE FIGURES

Additional advantages of the invention will become apparent upon reading the following detailed description and upon reference to the drawings, in which.

DETAILED DESCRIPTION

An exemplary embodiment is described with reference to specific configurations. Those skilled in the art will appreciate that various changes and modifications can be made while remaining within the scope of the claims.

Figure 1:
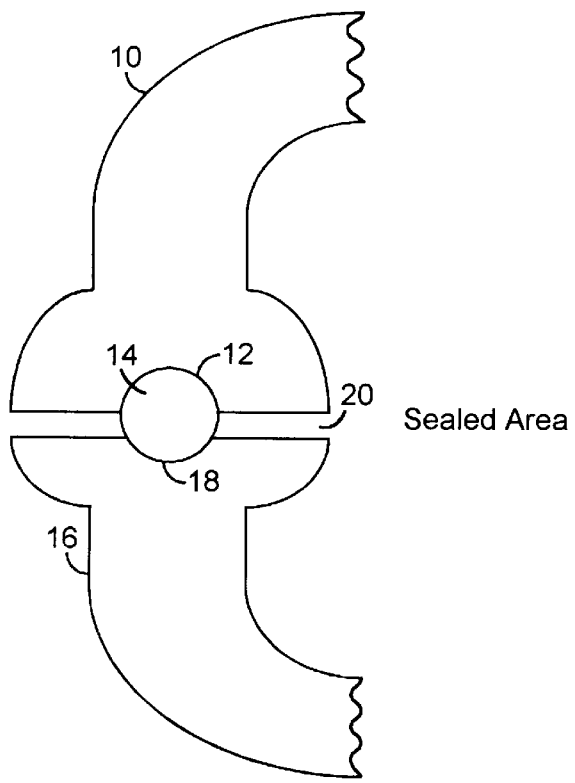
FIG. 1 depicts conventional structure according to the prior art.
Figure 2:
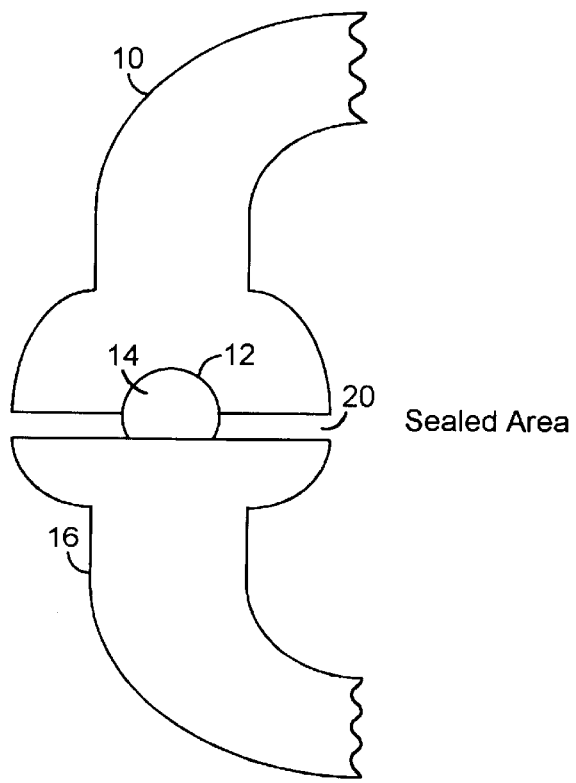
FIG. 2 depicts conventional structure according to the prior art.
Figure 3:
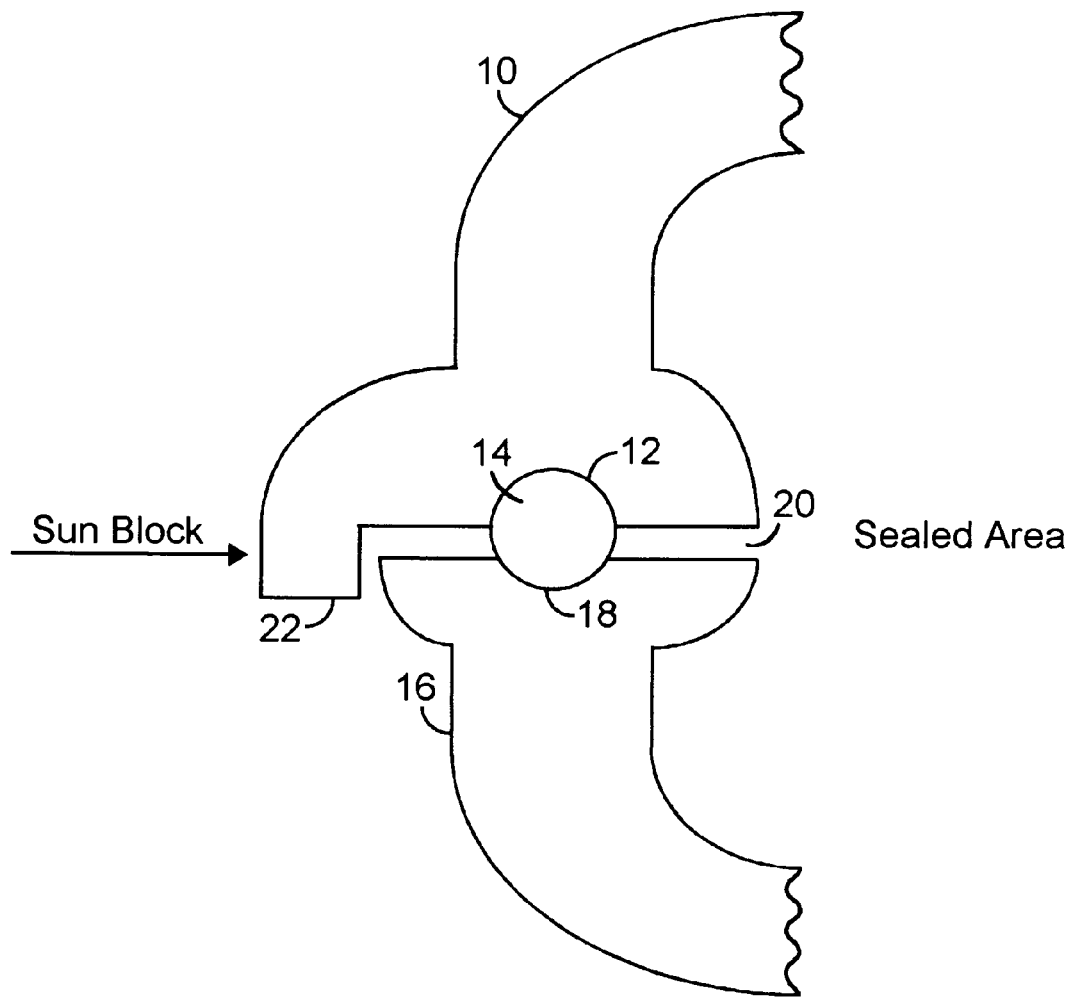
FIG. 3 dipicts conventional structure according to the prior art.
Figure 4A:
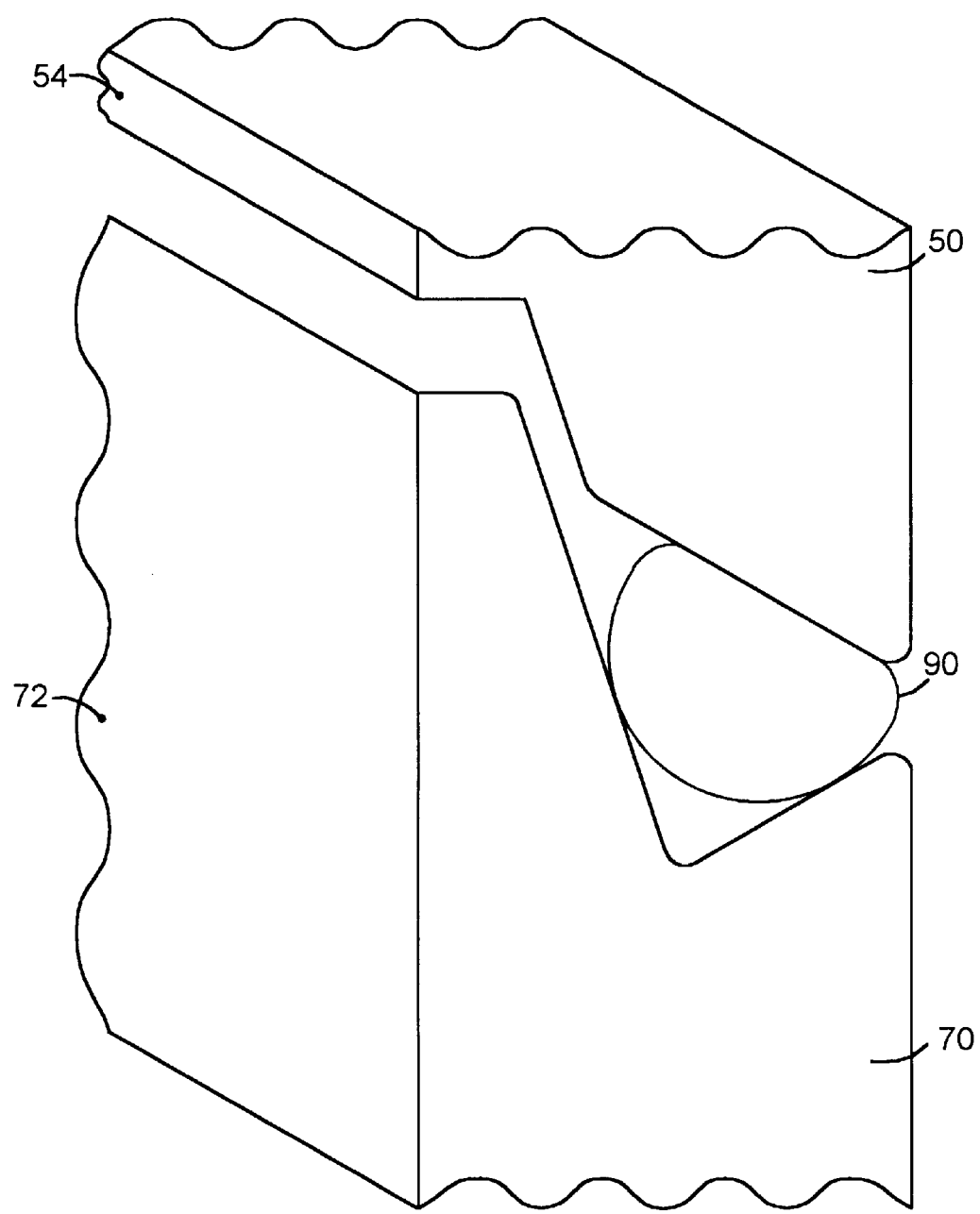
FIGS. 4A–B depict dove-tail structure according to an embodiment of the invention.
Figure 4B:
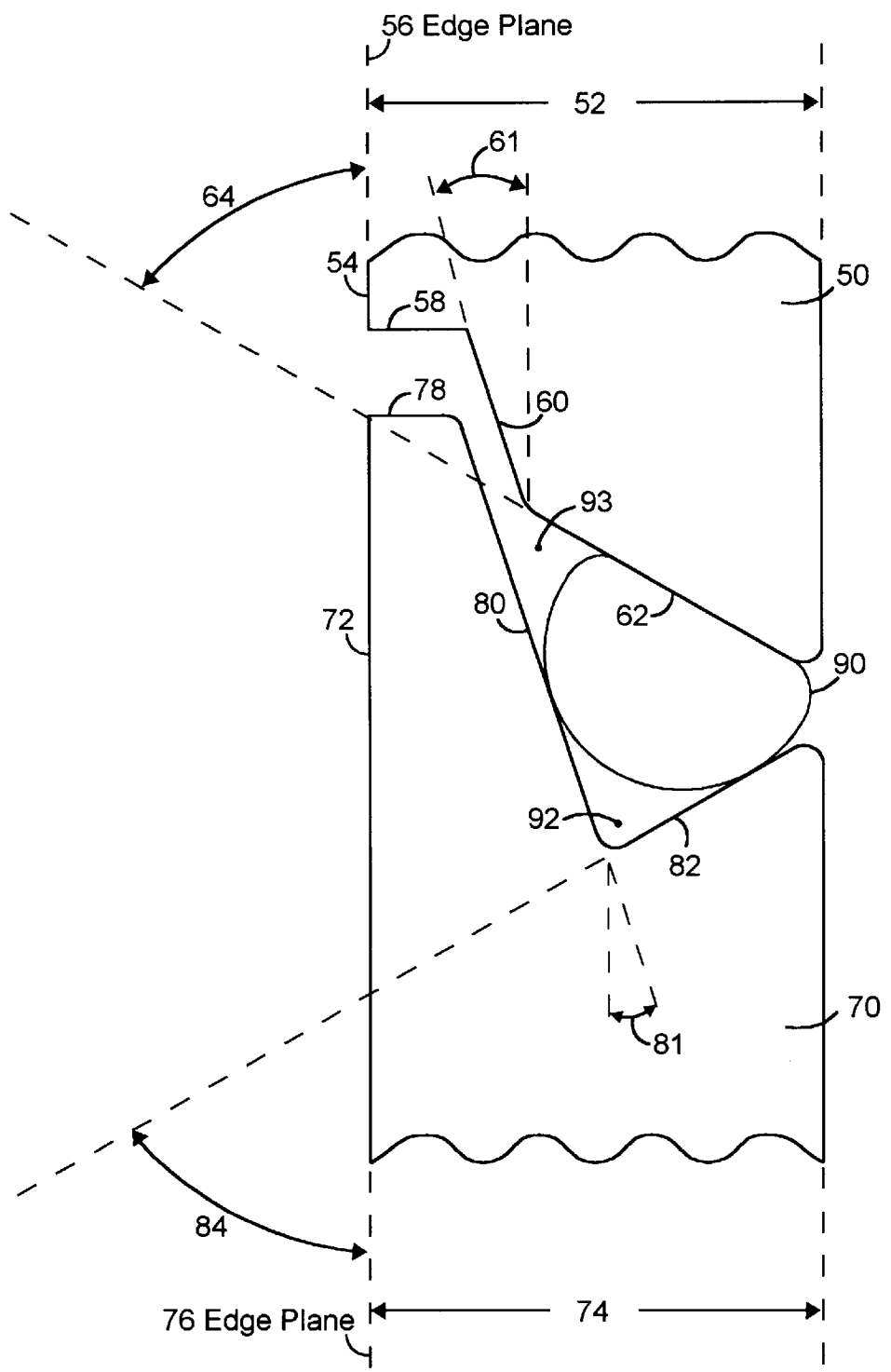

The exemplary embodiment is described with reference to FIGS. 4A–B. A first structure 50 has a thickness denoted as 52. An external surface 54 has an edge plane 56 substantially parallel to the external surface 54. A first surface 58 is formed substantially perpendicular to the first edge plane 56. A second surface 60 is adjacent to the first surface 58 and at an acute angle 61 to the first edge plane 56. Angle 61 can be, for example 0 to 10 degrees. A third surface 62 is adjacent to the second surface 60 and at a positive acute angle 64 to the first edge plane 56. Angle 64 can be, for example, approximately 55 to 65 degrees.

A second structure 70 has a thickness denoted as 74. An external surface 72 has a second edge plane 76 substantially parallel to the external surface 72. A fourth surface 78 is formed substantially perpendicular to the second edge plane 76. A fifth surface 80 is adjacent to the fourth surface 78 and at an acute angle 81 to the second edge plane 76. Angle 81 can be, for example 0 to 10 degrees. A sixth surface 82 is adjacent to the fifth surface 80 and at a negative acute angle 84 to the second edge plane 76. Angle 84 can be, for example, approximately 55 to 65 degrees.

The first surface 58 and the fourth surface 78 are configured to complement one another, the second surface 60 and the fifth surface 80 are configured to complement one another, and the third surface 62 and the sixth surface 82 are configured to oppose one another.

A gasket 90 is positioned between the first structure and the second structure to complete the seal. The gasket 90 contacts the third surface 62, the fifth surface 80 and the sixth surface 82. When the first structure 50 and the second structure 70 are pressed together, the gasket 90 deforms and completes the seal. The first structure and the second structure will be held together, for example, by a latch or bolt (not shown).

The gasket 90 will also need room to deform as the first structure 50 and the second structure 70 are pressed together. The fifth surface 80 and sixth surface 82 form an acute angle with a first recess 92 where the gasket can deform. This surface 62 and surface 80 form an acute angle with a second recess 93 where the gasket can also deform. As a result, the first structure 50 and the second structure 70 are sealed together and contaminants can not penetrate between the union of the first structure 50 and the second structure 70.

Additionally, the thickness of the joint between the first structure and the second structure 70 will be substantially constant. This is an important feature because it allows the joint to be substantially continuous and appear flush. Moreover, the structure prevents exposure of the gasket material to sunlight or other harmful contaminants.

Advantages of the invention an upper structure and a lower structure that provide a good seal but with a smaller size than conventional structures, and that when the upper structure and the lower structure are joined has substantially the same thickness of the upper structure and the lower structure and shields the gasket material from sunlight and contaminants.

Alternate embodiments can be created, for example, by positioning the upper structure as the lower structure, or by exchanging the outer surface and the inner surface. Such terms are used to describe the exemplary embodiment and do not necessarily reflect the only way that the structures can be constructed.

Having disclosed exemplary embodiments and the best mode, modifications and variations may be made to the disclosed embodiments while remaining within the scope of the invention as defined by the following claims.

What is claimed is:

1. A split dove-tail gasket channel structure comprising:

a first structure having a first external surface and a first edge plane substantially parallel to said first external surface, a first surface substantially perpendicular to said first edge plane, a second surface adjacent to said first surface and at an acute angle to said first edge plane, and a third surface adjacent to said second surface at an acute angle to said first edge plane and at an obtuse angle to said second surface;

a second structure having a second external surface and a second edge plane substantially parallel to said second external surface, a fourth surface substantially perpendicular to said second edge plane, a fifth surface adjacent to said fourth surface and at an acute angle to said second edge plane, and a sixth surface adjacent to said fifth surface and at an acute angle to said second edge plane; and wherein said first surface and said fourth surface are configured to complement one another, said second surface and said fifth surface are configured to complement one another and said third surface and said sixth surface are configured to oppose one another.

2. The split dove-tail gasket channel structure of claim 1, wherein:

said sixth surface is positioned at an acute angle with respect to said fifth surface, creating a channel therebetween.

3. The split dove-tail gasket channel structure of claim 2, further comprising:

a gasket positioned between said third surface and said channel formed by the acute angle between said sixth surface and said fifth surface.

4. The split dove-tail gasket channel structure of claim 3, wherein:

when said first structure and said second structure are joined, a thickness of the joint is substantially the same as a thickness of said first structure and substantially the same as a thickness of said second structure.

5. The split dove-tail gasket channel structure of claim 2, wherein:

when said first structure and said second structure are joined, a thickness of the joint is substantially the same as a thickness of said first structure and substantially the same as a thickness of said second structure.

6. The split dove-tail gasket channel structure of claim 1, further comprising:

a gasket positioned between said third surface and said sixth surface.

7. The split dove-tail gasket channel structure of claim 6, wherein:

when said first structure and said second structure are joined, a thickness of the joint is substantially the same as a thickness of said first structure and substantially the same as a thickness of said second structure.

8. The split dove-tail gasket channel structure of claim 1, wherein:

when said first structure and said second structure are joined, a thickness of the joint is substantially the same as a thickness of said first structure and substantially the same as a thickness of said second structure.

* * * * *